(12) United States Patent
Botes et al.

(10) Patent No.: US 8,055,622 B1
(45) Date of Patent: Nov. 8, 2011

(54) IMMUTABLE DATA CONTAINERS IN TIERED STORAGE HIERARCHIES

(75) Inventors: Par Botes, Mountain View, CA (US); Michael Timpanaro-Perrotta, Cupertino, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1441 days.

(21) Appl. No.: 10/999,883

(22) Filed: Nov. 30, 2004

(51) Int. Cl.
*G06F 17/00* (2006.01)
*G06F 13/00* (2006.01)

(52) U.S. Cl. .......................... 707/640; 707/661; 711/161

(58) Field of Classification Search .................. 707/204, 707/999.204, 640, 661, 665; 711/161
See application file for complete search history.

(56) References Cited

U.S. PATENT DOCUMENTS

| | | | |
|---|---|---|---|
| 5,873,103 A * | 2/1999 | Trede et al. ........................... | 1/1 |
| 6,269,382 B1 | 7/2001 | Cabrera et al. | |
| 6,330,572 B1 | 12/2001 | Sitka | |
| 6,505,241 B2 | 1/2003 | Pitts | |
| 6,529,996 B1 * | 3/2003 | Nguyen et al. ................. | 711/114 |
| 6,804,719 B1 * | 10/2004 | Cabrera et al. ................. | 709/226 |
| 6,981,005 B1 * | 12/2005 | Cabrera et al. ........................... | 1/1 |
| 7,007,048 B1 | 2/2006 | Murray et al. | |
| 7,117,246 B2 * | 10/2006 | Christenson et al. .......... | 709/206 |
| 7,155,460 B2 * | 12/2006 | McGovern et al. ........... | 707/200 |
| 7,194,506 B1 * | 3/2007 | White et al. .................. | 709/203 |
| 7,680,830 B1 * | 3/2010 | Ohr et al. .................... | 707/999.2 |
| 7,865,877 B2 * | 1/2011 | Clemm et al. ................. | 717/121 |
| 2002/0156719 A1 * | 10/2002 | Finebaum et al. .............. | 705/37 |
| 2003/0018878 A1 * | 1/2003 | Dorward et al. .............. | 711/216 |
| 2003/0208490 A1 * | 11/2003 | Larrea et al. ....................... | 707/9 |
| 2004/0003013 A1 * | 1/2004 | Coulthard et al. ............. | 707/205 |
| 2004/0167913 A1 * | 8/2004 | Margolus ....................... | 707/100 |
| 2004/0199566 A1 | 10/2004 | Carlson et al. | |
| 2004/0267801 A1 * | 12/2004 | Dunsmore et al. ............. | 707/102 |
| 2005/0195660 A1 * | 9/2005 | Kavuri et al. ............. | 365/189.05 |
| 2006/0053262 A1 * | 3/2006 | Prahlad et al. ................. | 711/162 |
| 2006/0095687 A1 * | 5/2006 | Hsu et al. ....................... | 711/152 |
| 2006/0129441 A1 * | 6/2006 | Yankovich et al. ............... | 705/8 |

OTHER PUBLICATIONS

Davies, Lars, "EMC Centera and Legal Compliance in the Financial Services Industry", Sep. 1, 2003, pp. 1-8, downloaded from: www.emc.com/pdf/news/0303_larsdavies.pdf.*
"EMC Centera Integration", Saperion Product Information, © Aug. 2004, pp. 1-2, downloaded from: www.mysaperion.com/media/pdf/downloadCenter/eng/flyer/01_ProductFlyer_PF/E_PF_EMC_Centera.pdf.*

(Continued)

*Primary Examiner* — Robert Stevens
(74) *Attorney, Agent, or Firm* — Robert C. Kowert; Meyertons, Hood, Kivlin, Kowert & Goetzel, P.C.

(57) ABSTRACT

System and method for providing immutable data containers in tiered storage hierarchies. Embodiments may allow fulfillment of regulatory requirements for retaining certain data through management of a user-defined policy. The policy may specify what data in the file system needs to be stored as immutable data to the immutable data container in the file system. File system data may be tracked, and data specified by the policy may be transparently and automatically stored to the immutable data container within the file system. Updates to the data specified by the policy may also be stored to the immutable data container. This may be performed without overwriting or modifying the earlier version(s) of the data stored to the immutable data container, and thus every version of the data specified by the policy may be stored to and, if necessary, reconstructed from the immutable data container.

29 Claims, 7 Drawing Sheets

OTHER PUBLICATIONS

Story, Phil, "XenData Competitive Analysis", Nov. 2002, pp. 1-3, downloaded from: www.rorke.com/downloads/xen_WORM_wp.pdf.*

Fonseca, Brian, "EMC Centera Upgrade Extends Online Archiving", Jul. 19, 2004, pp. 1-2, downloaded from: www.eweek.com/article2/0,1895,1624454,00.asp.*

Wang, Yongge, et al., "Fast and Secure WORM storage Systems", SISW '03, Oct. 31, 2003, pp. 11-19.*

Hsu, Windsor W., et al., "Fossilization: A Process for Establishing Truly Trustworthy Records", IBM Research Report, RJ10331 (A0410-017), Oct. 18, 2004, pp. i and 1-11.*

"Meeting SEC 17a-4 Regulations Using WORM Tape and XenData Archive Series Software", May 2004, pp. 1-3, downloaded from: www.aittape.com/pdf/SEC_17a4_Compliance.pdf.*

"Guide to Integrating VERITAS DLM with NetAppNearStore and SnapLock", Technical Report TR3327, Network Appliance Inc., Jul. 2004, pp. 1-19 (downloaded from: www.virtual.com/whitepapers/NetApp_VERITAS_Guide.pdf).*

Brodsky, Dima, et al., "Using Versioning to Simplify the Implementation of a Highly-Available File System", CiteSeer, © 2001, pp. 1-5.*

Brodsky, Dima, et al., "Mammoth: A Peer-to-Peer File System", UBC CS Technical Report TR-2003-11, Univ. of British Columbia Dept. of Computer Science, Jun. 14, 2002, pp. 1-15.*

Santry et al., "Elephant: The File System that Never Forgets," Proceedings of the IEEE Workshop on Hot Topics in Operating Systems (HOTOS), Mar. 1999, (6 pages).

Peterson et al., "Limiting Liability in a Federally Compliant File System," Workshop on Sensitive Data in Medical, Financial, and Content-Distribution Systems, Privacy, Obligations, and Rights in Technologies of Information Assessment (PORTIA), 2004, (28 pages).

Peterson et al., "Ext3cow: The Design, Implementation, and Analysis of Metadata for a Time-Shifting File System," Technical Report HSSL-2003-03 Hopkins Storage System Labs, Department of Computer Science, The John Hopkins University, 2003, (14 pages).

Kohl et al., "HighLight: Using a Log-structured File System for Tertiary Storage Management," USENIX Association, 2003, (15 pages).

Muller et al., "A High Performance Multi-Structured File System Design," 1991 ACM, Mar. 1991, (pp. 56-67).

Santry et al., "Deciding when to forget in the Elephant file system," 1999 ACM, Feb. 1999, (pp. 110-123).

Carl Staelin, "The Coconut file system: utilizing tape-based robotic storage," USENIX Workshop on File Systems, May 21-22, 1992, (2 pages).

Kossmann et al., "Cache Investment: Integrating Query Optimization and Distributed Data Placement," ACM Transactions on Database Systems, vol. 25, No. 4, Dec. 2000, (pp. 517-558).

Castro et al., "HAC: Hybrid Adaptive Caching for Distributed Storage Systems," Proceedings of the ACM Symposiuym on Operating System Principles (SOSP '97), Oct. 1997, (18 pages).

* cited by examiner

IMMUTABLE DATA CONTAINERS IN TIERED STORAGE HIERARCHIES

BACKGROUND OF THE INVENTION

1. Field of the Invention

This invention is related to the field of computer systems and, more particularly, to data storage systems.

2. Description of the Related Art

Regulatory compliance is a major concern of business entities such as corporations. The financial industry and public companies are subjected to increasing amounts of scrutiny about how they perform financial transactions. As part of this scrutiny, business entities may be required to conform to regulations regarding data retention. For example, regulations may specify that any data pertaining to certain types of work that a company does or that certain officers of the company participate in must be kept for a certain period of time, and during that time the data must not be altered; in other words, the data must be immutable.

The regulations requiring immutability do not say how immutability of data should be implemented. Vendors spend time and resources working on solutions to guarantee that certain data is not altered. One solution is to store the data offline, for example on a WORM (Write Once, Read Many) device such as a CD-R or some other immutable data container. An immutable data container can be one or more independent devices or a collection of devices represented as one virtual device. One such device is the EMC Centerra. Once on the immutable data container, the data cannot be changed. However, conventional solutions for data retention typically require business entities to use non-standard interfaces and customization of both applications and storage infrastructure to meet the new regulatory requirements.

File Systems

A file system may be defined as a collection of files and file system metadata (e.g., directories and inodes) that, when set into a logical hierarchy, make up an organized, structured set of information. File systems organize and manage information stored in a computer system. File systems may support the organization of user data by providing and tracking organizational structures such as files, folders, and directories. A file system may interpret and access information stored in a variety of storage media, abstracting complexities associated with the tasks of locating, retrieving, and writing data to the storage media. File systems may be mounted from a local system or remote system. File system software may include the system or application-level software that may be used to create, manage, and access file systems.

File system metadata may be defined as information that file system software maintains on files stored in the file system. File system metadata may include, but is not limited to, definitions and descriptions of the data it references. File system metadata may include one or more of, but is not limited to, inodes, directories, mapping information in the form of indirect blocks, superblocks, etc. Generally, file system metadata for a file includes path information for the file as seen from the application side and corresponding file system location information (e.g. device:block number(s)). File system metadata may itself be stored on a logical or physical device within a file system.

Tiered Storage Hierarchies

Figure 1:
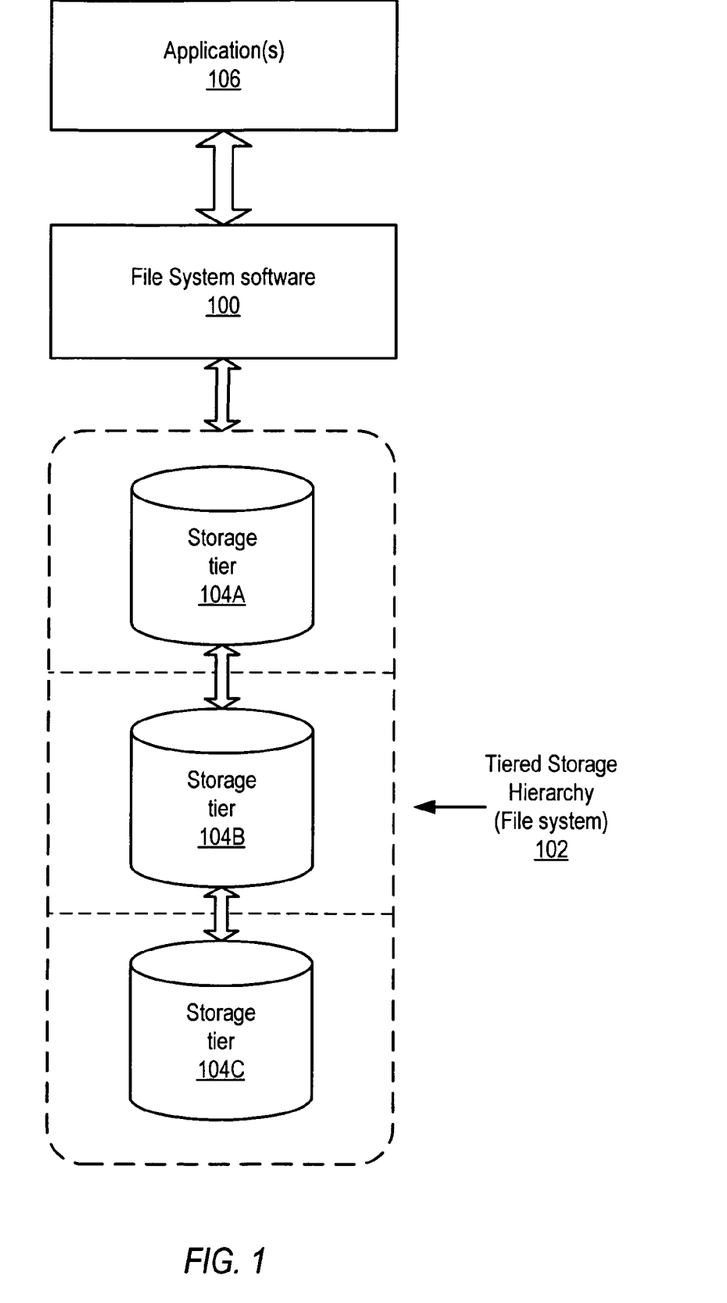
FIG. 1 illustrates file system software implementing a generic tiered storage hierarchy with three storage tiers.

Some file systems may be implemented as tiered storage hierarchies. In tiered storage hierarchies, two or more tiers of storage are implemented, data may be stored to one or more of the tiers, and stored data may be moved or migrated between the tiers of storage. Storage and migration of data may be controlled by a set of rules or policy. Hierarchical Storage Management (HSM) is an exemplary data storage solution for implementing tiered storage hierarchies. FIG. 1 illustrates file system software 100 implementing a generic tiered storage hierarchy 102 with three storage tiers 104. Tiered storage hierarchy 102 is a file system. File system software 100 may include the system or application-level software that may be used to create, manage, and access the file system. Note that each storage tier 104 may include one or more physical storage devices or, alternatively, may be implemented as volumes or virtual devices allocated across one or more physical storage devices.

In conventional tiered storage hierarchies, all data stored within the file system implemented as a tiered storage hierarchy is mutable, or modifiable. To make a set of data immutable, the data must be moved out of the primary file system, or "offline", to tertiary storage.

Hierarchical Storage Management (HSM)

Hierarchical Storage Management (HSM) is a data storage solution that provides access to vast amounts of storage space while reducing the administrative and storage costs associated with data storage. HSM systems may move files along a hierarchy of storage devices that may be ranked in terms of cost per megabyte of storage, speed of storage and retrieval, and overall capacity limits. Files are migrated along the hierarchy to less expensive forms of storage based on rules that may be tied to the frequency of data access. In HSM file systems, data access response time and storage costs typically determine the appropriate combination of storage devices used. A typical three-tier HSM architecture may include hard drives as primary storage, rewritable optical as secondary storage, and tape as tertiary storage. Alternatively, hard drives may be used for secondary storage, and WORM (Write Once, Read Many) optical may be used as tertiary storage.

Rather than making copies of files as in a backup system, HSM migrates files to other forms of storage, freeing hard disk space. Events such as crossing a storage threshold and/or reaching a certain file "age" may activate the migration process. As files are migrated off primary storage, HSM leaves stubs to the files on the hard drive(s). These stubs point to the location of the file on the alternative storage, and are used in automatic file retrieval and user access. The stub remains within the file system of the primary storage, but the file itself is migrated "offline" out of the file system onto the alternative or tertiary storage (e.g. tape).

SUMMARY

Embodiments of a system and method for providing immutable data containers in tiered storage hierarchies such as multi-volume file systems are described. Embodiments may, for example, allow business entities to fulfill regulatory requirements for retaining certain data as immutable data through management of a user-defined policy. In a tiered storage hierarchy, a QoSS (Quality of Storage Service) layer may enable the movement of data according to the policy across tiers of storage; by enhancing this layer with an immutable data mechanism to support immutable storage of data to an immutable data container, business entities may transparently support data retention regulations without having to invest in new application infrastructure, and may defer the management of immutable data to higher-level policy within the storage subsystem.

An immutable data container may be implemented in software, hardware, and/or through the use of immutable media. In some embodiments, an immutable data container may be implemented as one or more independent devices that use immutable removable media such as CD-Rs or any other type of WORM (Write Once, Read Many) storage devices, or alternatively as a collection of devices represented as one immutable virtual device, such as an EMC Centerra or other similar devices.

Embodiments of the immutable data mechanism may use user-defined policy to monitor or track the data of a business entity in a file system implemented as a tiered storage hierarchy, such as a multi-volume file system. The policy may inform file system software including an immutable data mechanism as to what data in the file system needs to be stored as immutable data to the immutable data container in the file system. The data specified by the policy may be tracked by the immutable data mechanism and stored to the immutable data container online within the file system. Every update to the data specified by the policy may also be stored to the immutable data container. This may be performed without overwriting or modifying the earlier version(s) of the data stored to the immutable data container, and thus every version of the data specified by the policy may be stored to and, if necessary, reconstructed from the immutable data container.

Embodiments of the immutable data mechanism allow the policy to be defined in advance so that there is automated control over what is and what is not stored to the immutable data container in the file system, instead of having to go back later to manually select data to be stored to (offline) immutable storage.

The immutable data mechanism stores data as immutable data on the immutable data container according to the user-defined policy transparently to any applications and/or users that access the data and the file system. The policy may be defined up-front and accessed by the immutable data mechanism to determine which data are to be stored to the immutable data container; users or applications do not have to specify which data are to be stored to the immutable data container. In one embodiment, the immutable data mechanism may provide a mechanism or interface for users or applications to specify that particular data (e.g., a particular document or file) not indicated by the policy is to be stored as immutable data on the immutable data container. In one embodiment, policies may be added or modified and applied retroactively to the data in the file system to move or copy data to the immutable data container.

If the business entity is audited, the immutable data container may be used to reconstruct the data specified by the policy and stored to the immutable data container. The immutable data container media may be self-contained, and thus may be removed from the file system and put on another system to reconstruct the data. This may be useful, for example, to satisfy rules and regulations governing business financial transactions.

While embodiments are generally described in relation to tiered storage hierarchies with multiple tiers, embodiments may be implemented in single-tiered storage systems as well as in multi-tiered storage systems.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for providing immutable data containers in tiered storage hierarchies such as multi-volume file systems are described. In embodiments, a mechanism to support immutable data containers in a tiered storage hierarchy such as a multi-volume file system may, for example, allow business entities to fulfill regulatory goals through management of policy. One benefit a business entity may realize from an immutable data container mechanism (hereinafter referred to as an immutable data mechanism) in a namespace or file system that supports non-immutable data is simplified conformance to regulations regarding data retention. In tiered storage hierarchies such as a multi-volume file system, the immutable data mechanism may enable data to be kept as immutable data within the file system for regulatory, financial auditing, and/or other reasons. In a tiered storage hierarchy, a QoSS (Quality of Storage Service) layer may enable the movement of data according to policy across tiers of storage; by enhancing this layer with an immutable data mechanism to support immutable storage of data, business entities may transparently support data retention regulations without having to invest in new application infrastructure, and may defer the management of immutable data to higher-level policy within the storage subsystem.

Embodiments of the immutable data mechanism may use user-defined policy to track data creation and access in a file system to determine if newly created and/or accessed data are to be stored to an immutable component within the file system. As data is written to the immutable component, the data becomes "invincible" to the file system; however, as far as the file system is concerned, the immutable component is part of the file system, and thus data that is written there is not "offline". The immutable component stores original versions of data and updates to the original versions of data that the user-defined policy indicates should be kept as immutable data. This immutable component may be referred to as an immutable data container. The immutable data container is a part of the file system that stores immutable data. The data stored to the immutable data container may be used to reconstruct all versions of the immutable data specified by the policy if the rest of the file system is lost. The data on the immutable data container cannot be deleted unless the medium it is stored on is physically destroyed.

In one embodiment, the immutable data mechanism may be configured to store file system metadata in addition to file system data to immutable storage. In one embodiment, file system metadata for the data stored as immutable data on the immutable data container may be stored to immutable storage. In one embodiment, the file system metadata may be stored on the same immutable data container as the file system data. Alternatively, the metadata may be stored on a separate immutable data container. Note that metadata specific to the data stored on immutable storage (including file system data and file system metadata) may be maintained on the immutable data container(s), and may be used to reconstruct the data (including file system data and file system metadata) from the immutable data container(s) if necessary. In this document, where storing data to immutable storage is mentioned, it is to be understood that the data stored to immutable storage may, but does not necessarily, include both file system data (e.g., files) and file system metadata.

In some embodiments, file path information for data stored to an immutable data container may be immutable. In this embodiment, once a file or copy of a file is stored to an immutable data container, the file path information for that file on the immutable data container is immutable and thus cannot be modified.

Embodiments of the immutable data mechanism may provide the ability to store data (e.g., files) on an immutable data container while maintaining the data's original logical placement in the file system (for example, in a tier of a tiered storage hierarchy) where the data was created. In embodiments, the primary copy of data (e.g., a file) may be migrated or directly stored to an immutable data container. Modified copies of the data may then be stored to the immutable data container if and when the data is modified. Alternatively, the primary copy of data may be stored on other, mutable storage, and a copy of the data may be stored on the immutable data container for each instance of the data when the data is created or modified.

An immutable data container may be implemented in software, hardware, and/or through the use of immutable media. In some embodiments, an immutable data container may be implemented as one or more independent devices that use immutable removable media such as CD-Rs or any other type of WORM (Write Once, Read Many) storage devices, or alternatively as a collection of devices represented as one immutable virtual device. In some embodiments, an immutable data container may be implemented in software. For example, file system software may be configured to mark or designate a physical or logical device or devices as immutable, allowing writes and reads of data to the device(s) but preventing the data on the device(s) from being deleted or overwritten.

Embodiments of the immutable data mechanism may use user-defined policy to monitor or track the data of a business entity in a file system implemented as a tiered storage hierarchy, such as a multi-volume file system. The policy may instruct file system software including the immutable data mechanism as to what data in the file system needs to be stored to an immutable data container in the file system. The policy may specify data to be stored to an immutable data container based on any of one or more attributes of the data. The policy may, for example, specify data to be stored to an immutable data container based on one or more of, but not limited to, a particular user, position, department, or application that creates, modifies, views, and/or owns the data, the file type, the directory, tier, or file system the file is created in, and the content of the data (e.g., file) itself. The data specified by the policy may be tracked by the immutable data mechanism and stored to the immutable data container online within the file system. Every update to the data specified by the policy may also be stored to the immutable data container. This is performed without overwriting or modifying the earlier version(s) of the data, so that every version of the data specified by the policy may be stored to the immutable data container.

Embodiments of the immutable data mechanism may allow policy to be user-defined in advance so that there is automated control over what is and what is not stored to the immutable data container in the file system, instead of having to go back later to manually select data to be stored to (offline) immutable storage. In one embodiment, data not specified by the policy may be "manually" moved to the immutable data container, if necessary or desired. For example, regulations may require data to be stored for a regular officer for seven years, and for a CEO for fifteen years. If a person is promoted to an officer's position, data associated with that person may need to be moved to the immutable data container.

In one embodiment, policies affecting the selection of immutable data may be defined or modified "after the fact" and retroactively applied by the immutable data mechanism to the data in the file system. For example, a newly defined or modified policy may be applied retroactively to handle changes in business requirements and/or regulations. The newly defined or modified policy may be retroactively applied to the data in the file system to move or copy relevant data in the file system to the immutable data container. The policy may, for example, be modified to reflect a change in regulations, and may be retroactively applied to the data in the file system by the immutable data mechanism to move or copy relevant data to the immutable data container. Note that a new or modified policy may also remove or override a former requirement of the policy to maintain some of the data on the immutable data container.

The immutable data mechanism stores data as immutable data on the immutable data container according to the user-defined policy transparently to any applications and/or users that access the data and the file system. The policy may be defined up-front and accessed by the immutable data mechanism to determine which data are to be stored to the immutable data container; thus, users or applications do not have to specify which data are to be stored to the immutable data container during normal operations. However, in one embodiment, the immutable data mechanism may provide a mechanism or interface for users or applications to specify that particular data (e.g., a particular document or file) not indicated by the policy is to be stored as immutable data on the immutable data container. In one embodiment, policies may be added or modified and retroactively applied by the immutable data mechanism to handle changes in business requirements and/or regulations.

If the business entity is audited, the immutable data container may be used to reconstruct the data specified by the policy and stored to the immutable data container. The immutable data container media may be self-contained, and may include metadata specific to the data stored on the immutable data container, and thus may be removed from the file system and put on another system to reconstruct the data. This may be useful, for example, to satisfy rules and regulations governing business financial transactions.

In one embodiment, at least some of the data stored to the immutable data container may be compressed using one or more of a variety of compression algorithm. In this embodiment, to reconstruct the data, any compressed data is decompressed using the appropriate decompression algorithm.

While embodiments are generally described in relation to tiered storage hierarchies with multiple tiers, embodiments may be implemented in single-tiered storage systems as well as in multi-tiered storage systems.

Figure 2:
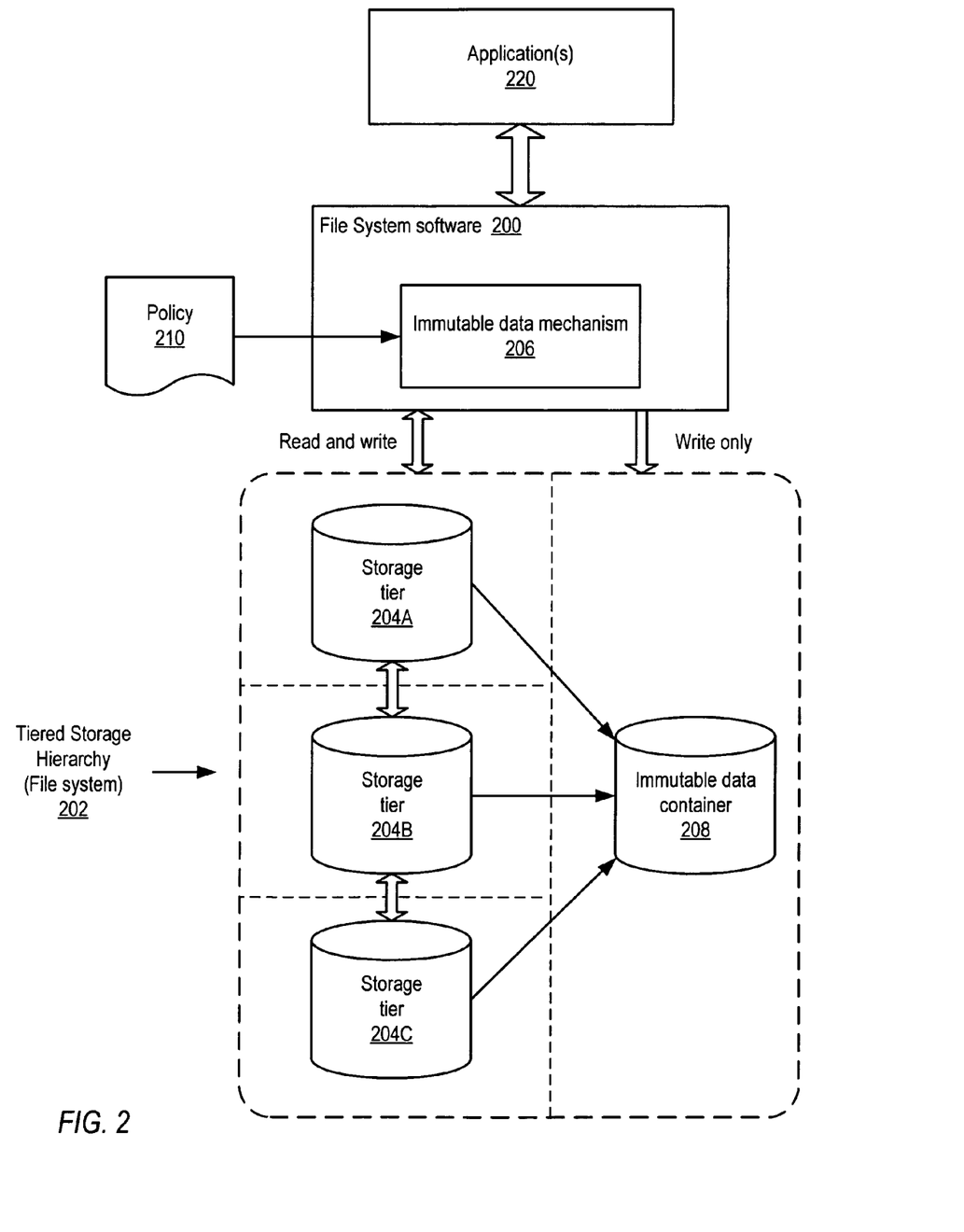
FIG. 2 illustrates an exemplary file system with file system software implementing a tiered storage hierarchy that includes an immutable data mechanism according to one embodiment.

FIG. 2 illustrates an exemplary file system with file system software implementing a tiered storage hierarchy that includes an immutable data mechanism according to one embodiment. Tiered storage hierarchy 202 is a file system, which may be implemented, for example, as a multi-volume file system or hierarchical file system (HSM). File system software 200 may include the system or application-level software that may be used to create, manage, and access the file system. Note that each storage tier 204 may include one or more physical storage devices or, alternatively, may be implemented as volumes or virtual devices allocated across one or more physical storage devices. The file system software 200 has the ability to write to or read from any storage tier 204 in the tiered storage hierarchy 202, and may also have the ability to move data from one storage tier 204 to another in the tiered storage hierarchy 202.

The file system may include an immutable data container 208. Immutable data container 208 may be implemented as one or more independent devices such as CD-Rs or any other type of WORM (Write Once, Read Many) storage devices, or alternatively as a collection of devices represented as one virtual device. The particular implementation of the immutable data container 208 may be independent of the implementation of the immutable data mechanism 206.

In the tiered storage hierarchy 202, the immutable data container 208 may be viewed as a tracking tier that is not conceptually higher or lower than any of the other tiers in the hierarchy, and that is accessible from any of the other tiers. Instead of viewing the file system as a conventional two-dimensional tiering model, the file system may be viewed as a three-dimensional tiering model, with the tracking tier spanning all the other dimensions.

File system software 200 may include an immutable data mechanism 206 for tracking data in the file system and, if necessary, storing data to the immutable data container 208 according to a user-defined policy 210. A policy 210 may include user-defined specifications defining what data is to be tracked and what data is to be stored to immutable data container 208. If new data is created by an application 220 is to be stored to the file system, or if data in the file system is accessed by an application 220, immutable data mechanism 206 may examine the data access to determine if, according to policy 210, a part or all of the new or accessed data needs to be stored to immutable data container 208.

Policy 210 may be accessed by file system software 200, and may include user-defined specifications for storing and moving data on the storage tiers 204. Policy 210 may also include user-defined specifications that may be used by the immutable data mechanism 206 to determine what data needs to be stored to the immutable data container 208. Any updates to the data stored to the immutable data container 208 by the immutable data mechanism 206 are also stored to the immutable data container 208. Thus, all the versions of the data specified by policy 210 are stored to the immutable data container 208 by the immutable data mechanism 206. Policy 210 may specify, for example, to move a file A to storage tier 204B under certain conditions, and may also specify that, if the file A is modified, to store any modifications to the immutable data container 208 in association with the original file A stored to the immutable data container 208.

Any characteristic or attribute of data desired by the user or required by a regulation may be used in policy 210 to indicate what data is to be stored to immutable data container 208. Attributes that may be used to specify data for storing to the immutable data container 208 may include one or more of, but are not limited to, the department the data belongs to, the type of the data (e.g., all documents that discuss financial transactions), the individual or position (e.g., the CEO) that generated the data, or a particular individual that viewed the data. Policy 210 may, for example, specify that part or all of the communications and updates to data to and from a particular person, position, or department are to be stored to the immutable data container 208. Policy 210 thus may indicate that data created or modified by a specified entity (e.g., department, position, or individual) is to be stored to the immutable data container 208. In addition to the creation or modification of data by particular entities, policy 210 may specify that data is to be stored to immutable data container on access of the data by particular entities. For example, the policy 210 may specify that a file is to be stored to the immutable data container 208 if a particular person (or a particular position, e.g. CEO) opens and views the file.

In one embodiment, data stored to the immutable data container 208 may be copies of data that is also stored on one of the storage tiers 204. In this embodiment, for example, when a file is created using an application 220 and stored to one of the storage tiers 204 by the file system software 200, the immutable data mechanism 206 may copy the file to the immutable data container 208 as a first version of the file if the policy 210 indicates that an immutable copy of the file needs to be kept. The immutable data mechanism 206 may then track the file and, if the file on one of the storage tiers 204 is later modified using an application 220, a new version of the file may be copied to the immutable data container 208. In one embodiment, a complete copy of the new version of the file may be stored to the immutable data container 208. In another embodiment, rather than storing a complete copy of the file, only the updates or deltas to the file may be stored to the immutable data container 208 in association with the original version of the file. In either case, the immutable data container 208 may be used to regenerate all versions of the file. Note that, if a file on one of the storage tiers 204 for which one or more versions are stored on the immutable data container 208 is deleted from the storage tier 204, all of the versions of the file on the immutable data container 208 are retained. Data stored on the immutable data container 208 cannot be deleted.

In another embodiment, rather than storing copies of data on the storage tiers 204 to the immutable data container 208, the data specified by policy 210 may be only stored on the immutable data container 208. In this embodiment, for example, when a file is created using an application 220, the immutable data mechanism 206 may store the file to the immutable data container 208 as a first version of the file if the policy 210 indicates that the file needs to be kept as immutable data. If the file stored on the immutable data container 208 later needs to be modified, a temporary working copy of the file may be created in memory or on one of the storage tiers 204. After the modifications are complete, a new version of the file may be stored to the immutable data container 208. In one embodiment, a complete copy of the new version of the file may be stored to the immutable data container 208. In another embodiment, rather than storing a complete copy of the file, only the updates or deltas to the file may be stored to the immutable data container 208 in association with the original version of the file. In either case, the immutable data container 208 may be used to regenerate all versions of the file.

Data stored to the immutable data container 208 is accessible within the file system and is not offline. Thus, the file system's metadata tracks data stored on the immutable data container 208 as well as data stored on the storage tiers 204. When data is moved or copied to the immutable data container 208, the file system metadata may be updated to indicate the location of the data on the immutable data container 208. File system software 200 may use the metadata to access data stored on the storage tiers 204 and on the immutable data container 208. File system metadata for data stored on immutable data container 208 may include information indicating that the data referenced by the metadata is immutable data stored on immutable data container 208. Immutable data mechanism 206 may use the file system metadata in tracking accesses of data to determine if updates to the data are to be stored to immutable data container 208.

Immutable data container 208 also includes self-contained, immutable metadata that may be used to reconstruct the data stored to the immutable data container 208 independent of the file system and the file system metadata. The metadata on the immutable data container 208 is specific to the immutable data container 208, and only needs to know about data stored on the immutable data container 208.

For example, if there is a file that is saved three different times, the immutable data container 208 needs to contain or be able to reconstruct all three versions of the file, even though all versions have the same name. How the versions of the file are stored (as complete documents or as the original document with the deltas representing the changes) is not critical. What is important is that all versions of the file can be reconstructed from the data stored to the immutable data container 208.

If, for example, the business entity is audited, the immutable data container 208 may be used to reconstruct the data. In one embodiment, the immutable data container 208 media may be self-contained, and thus may be removed from the file system and put on another system to reconstruct the data to satisfy rules and regulations governing business financial transactions.

In one embodiment, policies 210 affecting the selection of immutable data may be defined or modified "after the fact" and retroactively applied by the immutable data mechanism 206 to the data in the file system 202. For example, a newly defined or modified policy 210 may be applied retroactively to handle changes in business requirements and/or regulations. The newly defined or modified policy 210 may be retroactively applied to the data in the file system 202 to move or copy relevant data in the file system to the immutable data container 208. For example, regulations may require data to be stored for a regular officer for seven years, and for a CEO for fifteen years. If a person is promoted to an officer's position, data associated with that person may need to be moved to the immutable data container; the policy may be modified and retroactively applied by the immutable data mechanism to move the data associated with the new officer to the immutable data container. As another example, regulations may change to require the immutable storage of data associated with a position or department that was not formerly required. The policy 210 may be modified to reflect that change in regulations and retroactively applied to the data in the file system 202 to move or copy the relevant data to the immutable data container 208. Note that a new or modified policy 210 may also remove or override a former requirement of the policy to maintain some of the data on the immutable data container 208. For example if a person that holds an officer's position that requires the immutable storage of data is moved to another position that does not require the immutable storage of data, the policy may be modified to no longer store that person's data to the immutable data container 208.

Figure 3:
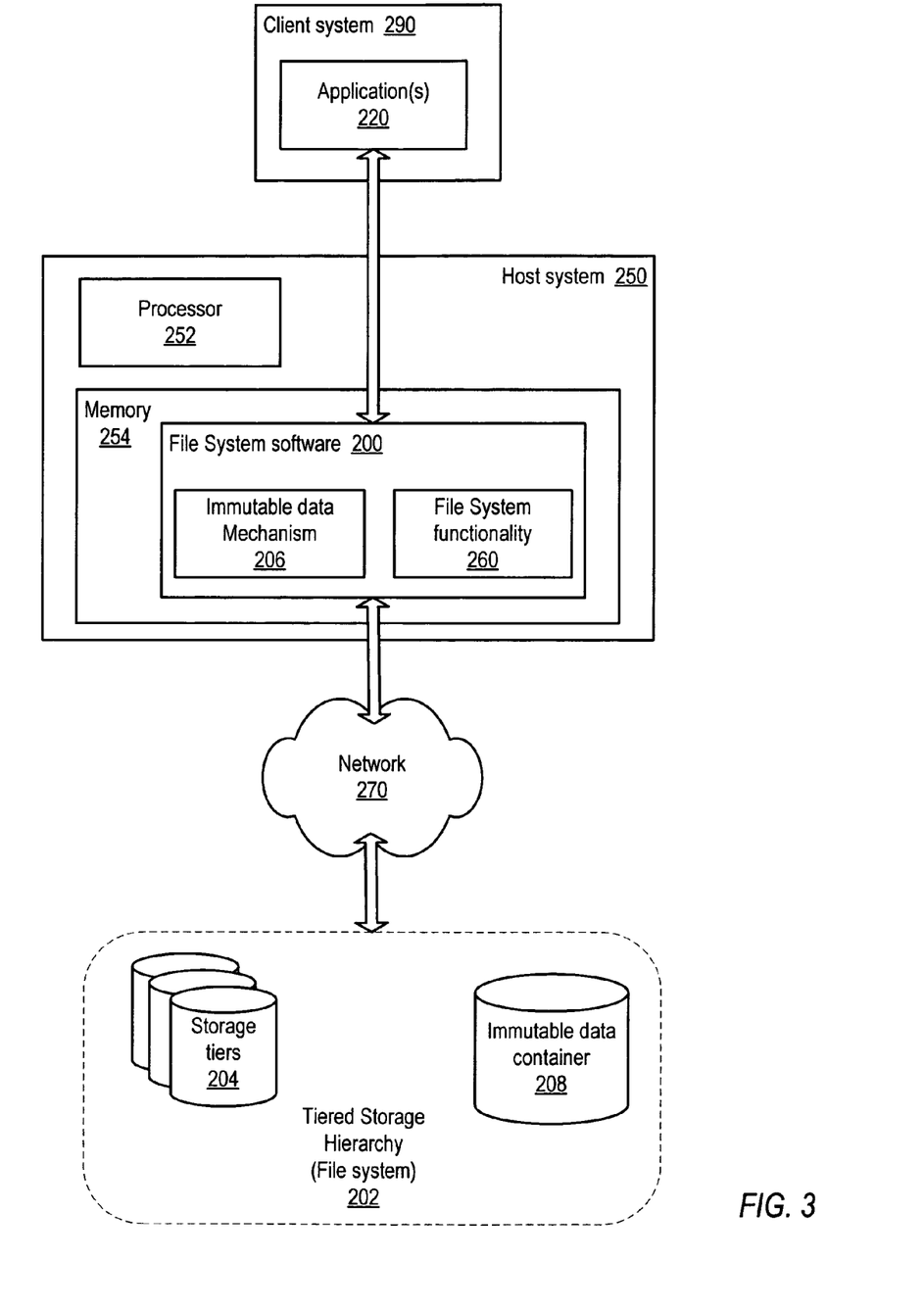
FIG. 3 illustrates an exemplary tiered storage hierarchy including an immutable data container in a network storage environment according to one embodiment.

FIG. 3 illustrates an exemplary tiered storage hierarchy including an immutable data container in a network storage environment according to one embodiment. Host system 250 may be any of various types of devices, including, but not limited to, a personal computer system, desktop computer, laptop or notebook computer, mainframe computer system, workstation, network computer, or other suitable device. Host system 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Host system 250 may couple, for example over a wired or wireless network or networks, to one or more other devices, e.g. client system 290, via one or more wired or wireless network interfaces. Host system 250 may couple over a network 270 to two or more storage devices on which a file system is implemented as a tiered storage hierarchy 202. These storage devices may include one or more storage devices for storing non-immutable data and on which one or more storage tiers 204 are implemented, and one or more storage devices for storing immutable data and which are configured as the immutable data container 208. Network 270 may, for example, be a Storage Area Network (SAN), a LAN with Network-Attached Storage (NAS), or any network capable of coupling storage devices to a host system 250. The storage devices used to implement the storage tiers 204 may include any of one or more types of storage devices including, but not limited to, storage systems such as RAID (Redundant Array of Independent Disks) systems, disk arrays, JBODs (Just a Bunch Of Disks, used to refer to disk cabinets that do not have a built-in RAID controller). Immutable data container 208 may be implemented as one or more independent devices such as CD-Rs or any other type of WORM (Write Once, Read Many) storage devices, or alternatively as a collection of devices represented as one virtual device.

Host system 250 may include, in memory 254, file system software 200. File system software 200 may include, but is not limited to, an embodiment of the immutable data mechanism 206 and software that provides "traditional" File System functionality 260. File System functionality 260 may be provided by any of various File System implementations including, but not limited to, disk-based file systems such as VERITAS' VxFS and UNIX File System (UFS), and networked file system such as Network File System (NFS) and AT&T's Remote File Share (RFS). In one embodiment, file system software 200 may also include a virtualization layer (not shown) that may be used to map file systems on the storage devices to a single file system and to present the single file system to one or more application(s).

File System functionality 260 of file system software 200 may implement, on one or more of the storage devices, a file system as a tiered storage hierarchy 202. In one embodiment, the software that provides the File System functionality 260 may be used to implement the tiered storage hierarchy and manage the assignment of files within the storage tiers 204 according to user-defined policy, while the immutable data mechanism 206 tracks files in the file system and moves files and updates to files to be stored as immutable data to the immutable data container 208 according to the user-defined policy.

The tiered storage hierarchy 202 may include one or more physical and/or logical storage devices organized in a hierarchy of two or more storage tiers 204 and a tracking tier (immutable data container 208) according to one or more characteristics of the storage devices and/or data requirements of the user(s) of the file system. For example, the storage tiers 204 may have three tiers—a first storage tier on one storage device, a second storage tier on another storage device, and a third storage tier on a third storage device. As another example, one storage device may be a first storage tier, and two other storage devices may both be included in a second storage tier. The tiered storage hierarchy 202 is made available to the application(s) 292 on client system 290 via host system 250 as one file system. The structure of the file system and the assignment and migration of data among the storage tiers and to the immutable data container 208 within the file system are transparent to the application(s) 292.

Note that the configuration illustrated in FIG. 3 is an exemplary implementation of a file system including an immutable data container and file system software including an immutable data mechanism in an exemplary network storage environment and is not intended to be limiting. Embodiments of the immutable data mechanism as described herein may be implemented in other configurations of systems and storage environments. For example, host system 250 and the storage devices in the tiered storage hierarchy may be directly connected rather than connected via a network. Also, note that application(s) that access the tiered storage hierarchy may be implemented on the system that includes the file system software and the immutable data mechanism. A minimum configuration for implementing an embodiment of the immutable data mechanism may be a single system, with one storage device (internal or external) on which the one or more storage tiers of the tiered storage hierarchy is implemented, and one storage device serving as the immutable data container or tracking tier within the file system.

Figure 4A:
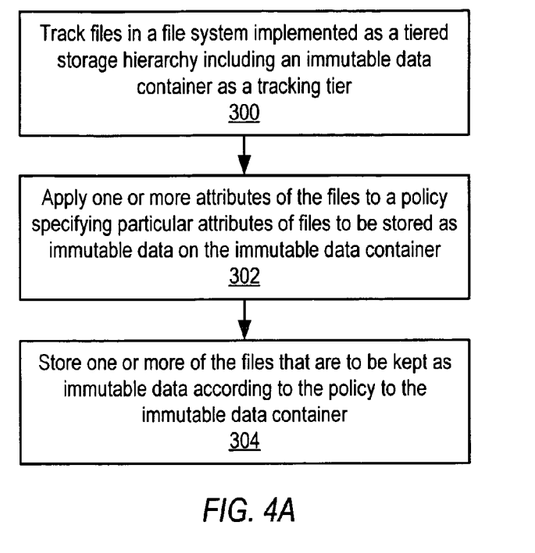
FIGS. 4A and 4B are flowcharts illustrating a method of operation for an immutable data mechanism in a file system according to one embodiment.
Figure 4B:
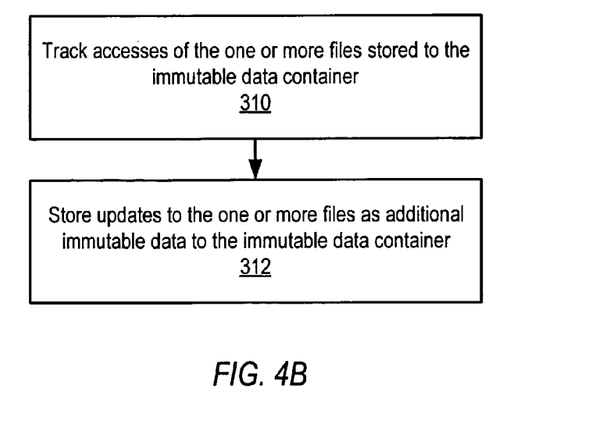

FIGS. 4A and 4B are flowcharts illustrating a method of operation for an immutable data mechanism in a file system according to one embodiment. In one embodiment, a file system may be implemented as a tiered storage hierarchy that may include one or more storage tiers and an immutable data container as a tracking tier. A host system may couple to the file system, for example via a network. The host system may include file system software that provides file system functionality for managing storage of files on the storage tiers in the file system and an immutable data mechanism. In FIG. 4A, the immutable data mechanism may track files in the file system as indicated at 300. Tracking may include detecting new files created by applications that use the file system to be stored to the file system via the host system. Tracking may also include tracking accesses of files that are already stored on the storage tiers. As indicated at 302, one or more attributes of the files may be applied to a policy specifying particular attributes of files that indicate the files are to be stored as immutable data on the immutable data container. The particular attributes of files to be stored as immutable data on the immutable data container and specified by the policy may include, but are not limited to, one or more specific entities that may create, modify, or access files within the file system.

The one or more specific entities may include, but are not limited to, specific departments, specific positions, or specific persons within a business entity.

As indicated at 304, if it is determined that one or more of the files being tracked are to be kept as immutable data according to the policy, the one or more of the files are stored to the immutable data container. The files stored to the immutable data container remain online within the file system. Note that, in one embodiment, the files stored to the immutable data container may be copies of files also stored on one or more of the storage tiers by the file system software. Files stored to the immutable data container may include, but are not limited to, new files whose attributes match attributes specified in the policy (e.g., the file was generated by a specific entity) and files previously stored to the storage tiers that were accessed by entities for which the policy specifies files viewed or modified by the entity are to be stored as immutable data. Storage of the files to the immutable data container is transparent to applications and users of file system.

File system metadata is generated for the files stored to the immutable data container that indicates that the one or more files are stored online within the file system on the immutable data container. Metadata is also generated on the immutable data container for stored as immutable data on the immutable data container. The metadata on the immutable data container is specific to the immutable data stored on the immutable data container.

In FIG. 4B, the immutable data mechanism tracks accesses of the files stored to the immutable data container, as indicated at 310. If any of the files stored to the immutable data mechanism are modified, updates to the files are stored as additional immutable data to the immutable data container, as indicated at 312.

The files stored as immutable data to the immutable data container and any updates to the files stored as additional immutable data to the immutable data container may be used to reconstruct all versions of the files from the immutable data container. Note that, in the event of a failure of the file system, the immutable data container may be configured to be removed from the system and placed in a different system to perform the reconstruction.

Figure 5A:
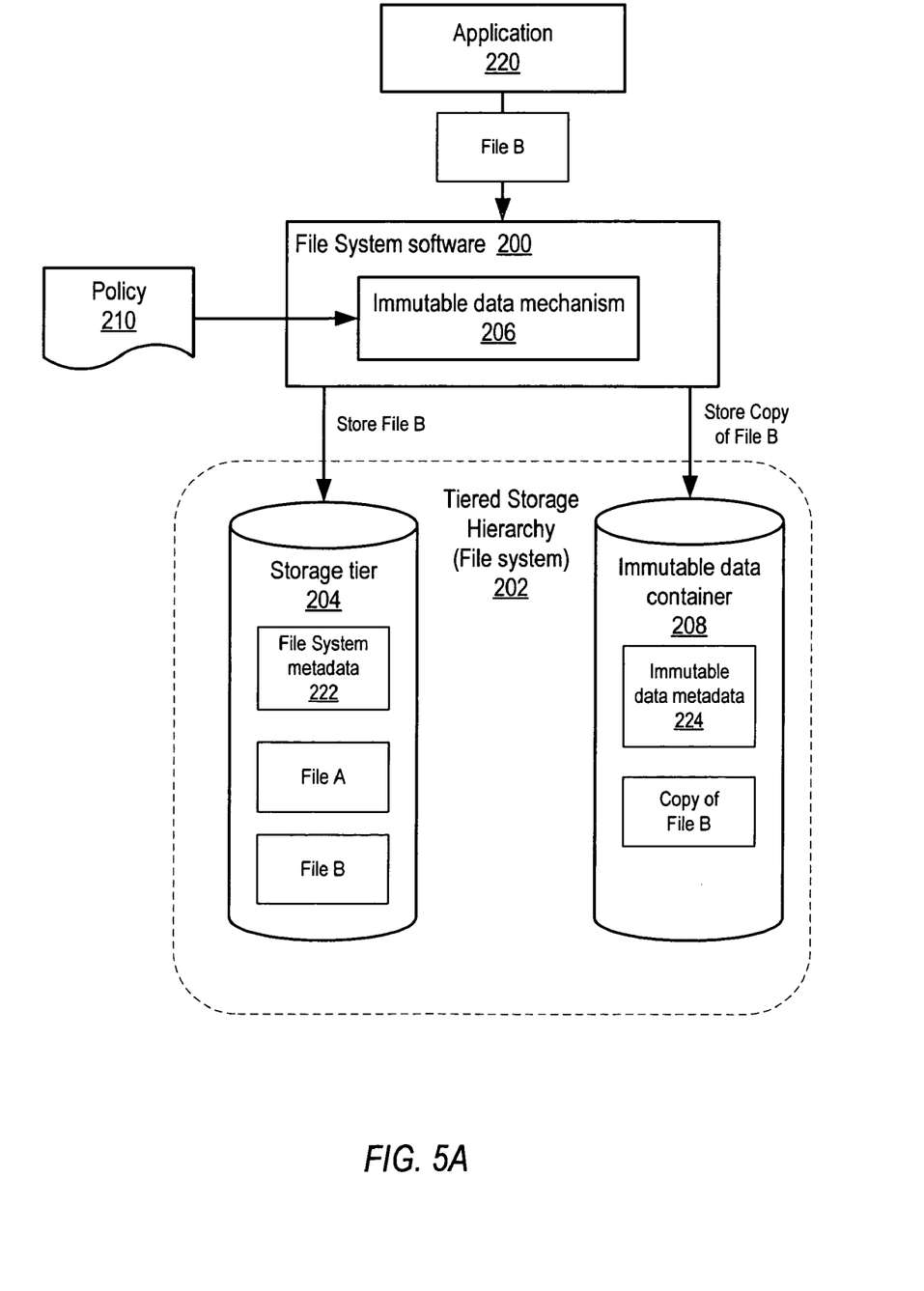
FIGS. 5A through 5C illustrate the storage of non-immutable and immutable data in an exemplary tiered storage hierarchy including an immutable data container according to one embodiment.
Figure 5B:
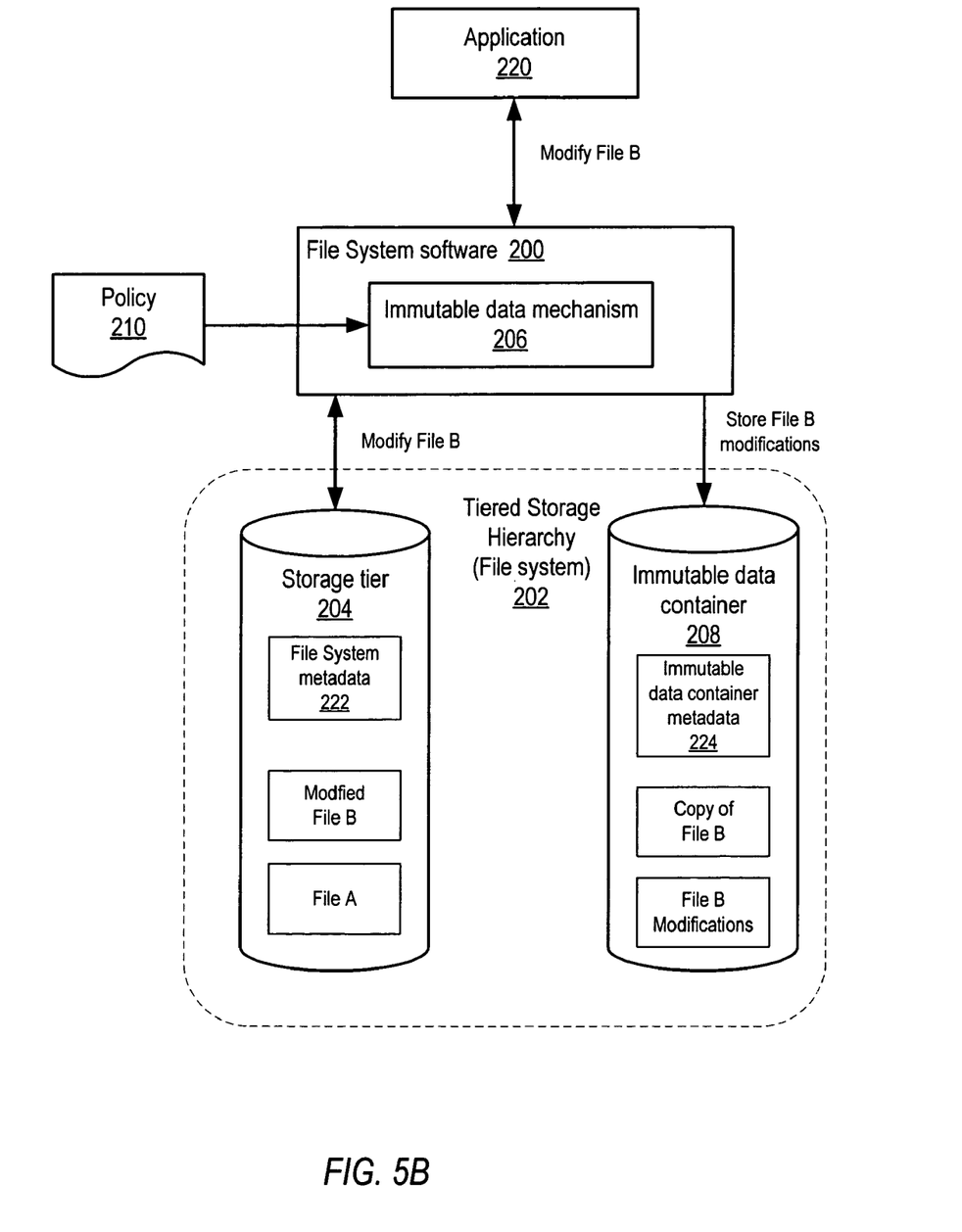
Figure 5C:
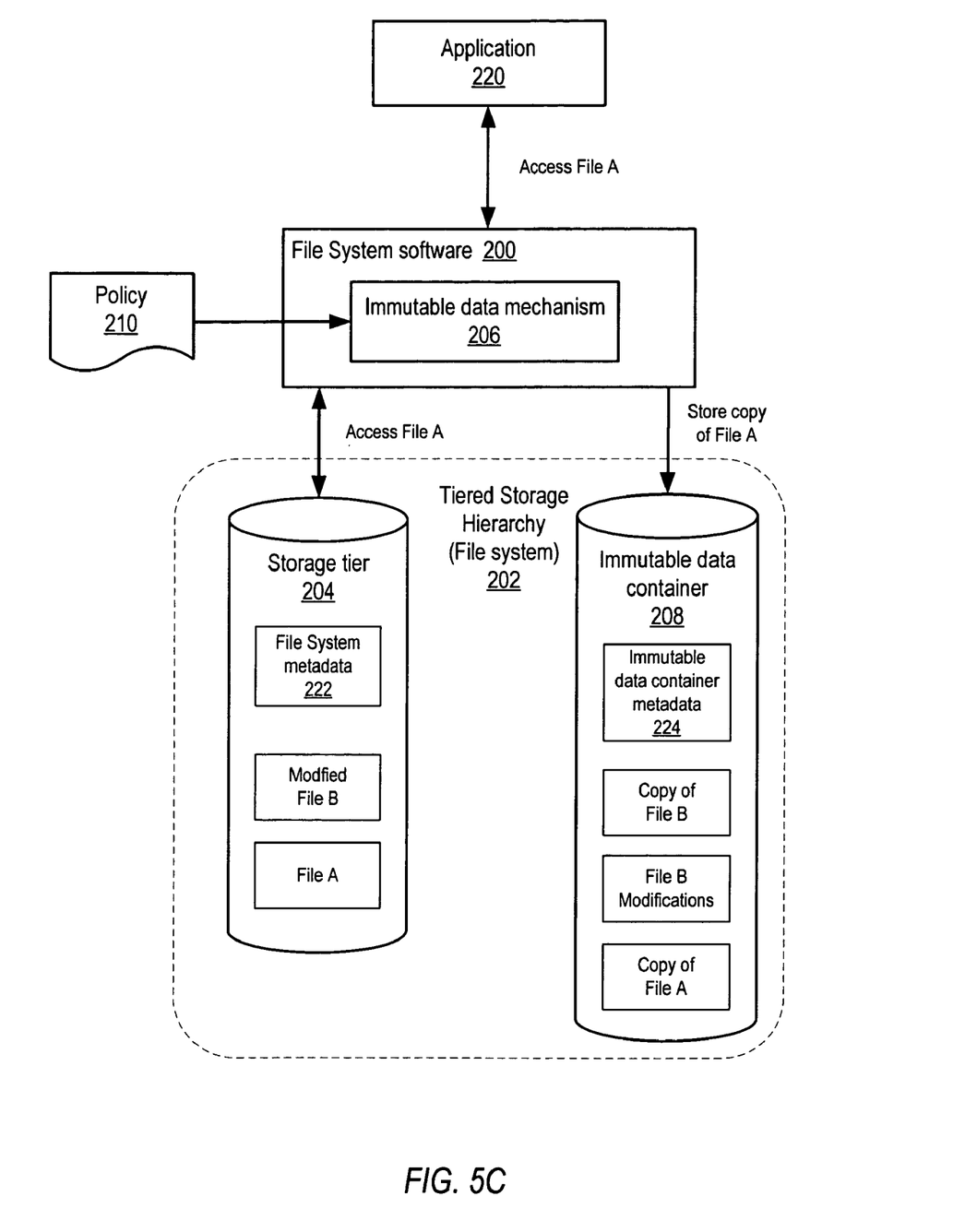

FIGS. 5A through 5C illustrate the storage of non-immutable and immutable data in an exemplary tiered storage hierarchy including an immutable data container according to one embodiment. In one embodiment, a file system may be implemented as a tiered storage hierarchy 202 that may include one or more storage tiers 204 and an immutable data container 208 as a tracking tier. A host system may couple to the file system, for example via a network. The host system may include file system software 200 that provides file system functionality for managing storage of files on the storage tiers 204 in the file system and an immutable data mechanism 206. In this example, tiered storage hierarchy 202 includes only one storage tier 204. Storage tier 204 initially includes one file, File A. File system metadata 222 is maintained by the file system software 200 on the storage tier 204. In addition, metadata 224 specific to the immutable data stored on the immutable data container 208 may be maintained on the immutable data container 208.

In FIG. 5A, an application 220 may be used to generate a new File B. The file system software 200 may store File B to the storage tier 204. File System metadata 222 may be updated to indicate the location of File B. Immutable data mechanism 206 may apply one or more attributes of File B to a user-defined policy 210 specifying particular attributes of files that indicate the files are to be stored as immutable data on the immutable data container 208. The particular attributes of files to be stored as immutable data on the immutable data container 208 and specified by the policy 210 may include, but are not limited to, one or more specific entities that may create, modify, or access files within the file system. The one or more specific entities may include, but are not limited to, specific departments, specific positions, or specific persons within a business entity.

If immutable data mechanism 206 determines that File B is to be kept as immutable data according to the policy 210, a copy of File B is stored to the immutable data container 208. The copy of File B stored to the immutable data container 208 remains online within the file system. Immutable data metadata 224 may be updated to indicate the location of the copy of File B on the immutable data container 208.

Immutable data mechanism 206 may track accesses of files stored on the immutable data container 208. In FIG. 5B, an application 220 may be used to modify File B on storage tier 204. The file system software 200 may store the modified File B to the storage tier 204. Immutable data mechanism 206 may detect the modification of File B, a copy of which was previously stored on the immutable data container 208. Immutable data mechanism 206 may then store the modifications to File B as immutable data on immutable data container 208. Immutable data metadata 224 may be updated to indicate the location of the File B modifications on the immutable data container 208.

Policy 210 may also specify that accesses of files stored on storage tier 204 by particular entities (e.g. persons, positions, or departments) are to trigger storing the files as immutable data. In FIG. 5C, an application 220 may be used to view File A, previously stored on storage tier 204. Immutable data mechanism 206 may detect the access of File A and store a copy of File A to immutable data container 208. Immutable data metadata 224 may be updated to indicate the location of the copy of File A on the immutable data container 208.

The files stored as immutable data to the immutable data container 208 and any updates to the files stored as additional immutable data to the immutable data container 208 may be used to reconstruct all versions of the files from the immutable data container 208. For example, in FIG. 5C, the copy of File B and the File B modifications may be used to reconstruct an original version of File B and a modified version of File B. Note that, in the event of a failure of the file system, the immutable data container may be configured to be removed from the system and placed in a different system to perform the reconstruction. Immutable data metadata 224 may be used to locate and reconstruct the files from the immutable data container 208.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory storing file system software that when executed by the at least one processor performs:
      managing files in a file system implemented as a tiered storage hierarchy comprising two or more storage tiers for storing mutable data, each storage tier including one or more storage devices, and an immutable data container for storing immutable data, wherein, in said managing files, the file system software performs storing files to and migrating files between the storage tiers according to a policy that includes specifications for storing files to and migrating files between the storage tiers;
   wherein the file system software comprises an immutable data mechanism that when executed by the at least one processor performs:
      tracking files in the file system;
      applying the policy to one or more attributes of the tracked files, wherein the policy specifies particular attributes of files to be migrated to the immutable data container as immutable data; and
      migrating one or more files in the file system to the immutable data container as immutable data in response to said applying the policy to attributes of the tracked files;
      wherein the one or more files migrated to the immutable data container remain online within the file system.

2. The system as recited in claim 1, wherein the immutable data mechanism further performs:
   tracking accesses of the one or more files on the immutable data container to detect updates to the one or more files; and
   storing detected updates to the one or more files to the immutable data container as additional immutable data.

3. The system as recited in claim 2, wherein the one or more files on the immutable data container and the updates to the one or more files on the immutable data container enable reconstruction of all versions of the one or more files from the immutable data container.

4. The system as recited in claim 3, wherein, to perform said reconstruction, the immutable data container is removed from the system and placed in a different system.

5. The system as recited in claim 1, wherein the immutable data mechanism further performs storing at least one newly created file to the immutable data container as immutable data in response to said applying the policy to attributes of the tracked files.

6. The system as recited in claim 1, wherein the file system software further performs generating file system metadata for the one or more files migrated to the immutable data container, wherein the file system metadata indicates that the one or more files are stored online within the file system on the immutable data container.

7. The system as recited in claim 1, wherein the immutable data mechanism further performs generating metadata on the immutable data container for the one or more files migrated to the immutable data container, wherein the metadata on the immutable data container is specific to the immutable data stored on the immutable data container.

8. The system as recited in claim 1, wherein said migrating one or more files to the immutable data container is transparent to an application accessing the file system.

9. The system as recited in claim 1, wherein the particular attributes of files to be migrated to the immutable data container as immutable data specified by the policy include one or more specific entities that create, modify, or access files within the file system.

10. The system as recited in claim 9, wherein the one or more specific entities include one or more of specific departments, specific positions, or specific persons within a business entity.

11. A system, comprising:
a file system implemented as a tiered storage hierarchy comprising two or more storage tiers for storing mutable data, each storage tier including one or more storage devices, and an immutable data container for storing immutable data;
a host system coupled to the file system, wherein the host system comprises file system software comprising:
a file system functionality component that when executed on the host system performs managing files on the storage tiers in the file system, wherein, in said managing files, the file system functionality component performs storing files to and migrating files between the storage tiers according to a policy that includes specifications for storing files to and migrating files between the storage tiers; and
an immutable data mechanism that when executed on the host system performs:
tracking the files in the file system;
applying the policy to one or more attributes of the tracked files, wherein the policy specifies particular attributes of files to be migrated to the immutable data container as immutable data; and
migrating one or more files in the file system to the immutable data container as immutable data in response to said applying the policy to attributes of the tracked files;
wherein the one or more files migrated to the immutable data container remain online within the file system.

12. The system as recited in claim 11, wherein the immutable data mechanism further performs:
tracking accesses of the one or more files on the immutable data container to detect updates to the one or more files; and
storing detected updates to the one or more files to the immutable data container as additional immutable data.

13. The system as recited in claim 12, wherein the one or more files on the immutable data container and the updates to the one or more files on the immutable data container enable reconstruction of all versions of the one or more files from the immutable data container.

14. The system as recited in claim 11, wherein the file system functionality component further performs generating file system metadata for the one or more files migrated to the immutable data container, wherein the file system metadata indicates that the one or more files are stored online within the file system on the immutable data container.

15. The system as recited in claim 11, wherein the immutable data mechanism further performs generating metadata on the immutable data container for the one or more files migrated to the immutable data container, wherein the metadata on the immutable data container is specific to the immutable data stored on the immutable data container.

16. The system as recited in claim 11, wherein the particular attributes of files to be migrated to the immutable data container as immutable data specified by the policy include one or more specific entities that create, modify, or access files within the file system, wherein the one or more specific entities include one or more of specific departments, specific positions, or specific persons within a business entity.

17. A system, comprising:
means for implementing a file system as a tiered storage hierarchy comprising two or more storage tiers for storing mutable data, each storage tier including one or more storage devices, and an immutable data container for storing immutable data
means for storing files to and migrating files between the storage tiers according to a policy that includes specifications for storing files to and migrating files between the storage tiers;
means for tracking files in the file system;
means for determining one or more of the tracked files to be migrated to the immutable data container as immutable data according to the policy, wherein the policy specifies particular attributes of files to be migrated to the immutable data container as immutable data;
means for migrating the one or more files to the immutable data container as immutable data and
means for storing updates to the one or more files to the immutable data container as additional immutable data;
wherein the one or more files migrated to the immutable data container remain online within the file system.

18. A computer-implemented method, comprising:
managing, by file system software on one or more devices, files in a file system implemented as a tiered storage hierarchy comprising two or more storage tiers for storing mutable data, each storage tier including one or more storage devices, and an immutable data container for storing immutable data, wherein said managing files comprises storing files to and migrating files between the storage tiers according to a policy that includes specifications for storing files to and migrating files between the storage tiers;
tracking, by the file system software, files in the file system;
applying, by the file system software, the policy to attributes of the tracked files, wherein the policy specifies particular attributes of files to be migrated to the immutable data container as immutable data; and
migrating, by the file system software, one or more files in the file system to the immutable data container as immutable data in response to said applying the policy to attributes of the tracked files;
wherein the one or more files migrated to the immutable data container remain online within the file system.

19. The computer-implemented method as recited in claim 18, further comprising:
tracking accesses of the one or more files on the immutable data container to detect updates to the one or more files; and
storing detected updates to the one or more files to the immutable data container as additional immutable data.

20. The computer-implemented method as recited in claim 19, further comprising reconstructing all versions of the one or more files from the one or more files stored to the immutable data container as immutable data and the updates to the one or more files stored to the immutable data container as additional immutable data.

21. The computer-implemented method as recited in claim 18, further comprising generating file system metadata for the one or more files migrated to the immutable data container, wherein the file system metadata indicates that the one or more files are stored online within the file system on the immutable data container.

22. The computer-implemented method as recited in claim 18, further comprising generating metadata on the immutable data container for the one or more files migrated to the immutable data container, wherein the metadata on the immutable data container is specific to the immutable data stored on the immutable data container.

23. The computer-implemented method as recited in claim 18, wherein the particular attributes of files to be migrated to the immutable data container as immutable data specified by the policy include one or more specific entities that create, modify, or access files within the file system, wherein the one or more specific entities include one or more of specific departments, specific positions, or specific persons within a business entity.

24. A non-transitory computer-accessible storage medium, comprising program instructions, wherein the program instructions are computer-executable to implement:
  managing files in a file system implemented as a tiered storage hierarchy comprising two or more storage tiers for storing mutable data, each storage tier including one or more storage devices, and an immutable data container for storing immutable data, wherein said managing files comprises storing files to and migrating files between the storage tiers according to a policy that includes specifications for storing files to and migrating files between the storage tiers;
  tracking files in the file system;
  applying the policy to attributes of the tracked files, wherein the policy specifies particular attributes of files to be migrated to the immutable data container as immutable data; and
  migrating one or more files in the file system to the immutable data container as immutable data in response to said applying the policy to attributes of the tracked files;
  wherein the one or more files migrated to the immutable data container remain online within the file system.

25. The non-transitory computer-accessible storage medium as recited in claim 24, wherein the program instructions are further computer-executable to implement:
  tracking accesses of the one or more files on the immutable data container to detect updates to the one or more files; and
  storing detected updates to the one or more files to the immutable data container as additional immutable data.

26. The non-transitory computer-accessible storage medium as recited in claim 25, wherein the one or more files on the immutable data container and the updates to the one or more files on the immutable data container enable reconstruction of all versions of the one or more files from the immutable data container.

27. The non-transitory computer-accessible storage medium as recited in claim 24, wherein the program instructions are further computer-executable to implement generating file system metadata for the one or more files migrated to the immutable data container, wherein the file system metadata indicates that the one or more files are stored online within the file system on the immutable data container.

28. The non-transitory computer-accessible storage medium as recited in claim 24, wherein the program instructions are further computer-executable to implement generating metadata on the immutable data container for the one or more files migrated to the immutable data container, wherein the metadata on the immutable data container is specific to the immutable data stored on the immutable data container.

29. The non-transitory computer-accessible storage medium as recited in claim 24, wherein the particular attributes of files to be migrated to the immutable data container as immutable data specified by the policy include one or more specific entities that create, modify, or access files within the file system, wherein the one or more specific entities include one or more of specific departments, specific positions, or specific persons within a business entity.

* * * * *